(12) United States Patent
Jun et al.

(10) Patent No.: US 7,455,825 B2
(45) Date of Patent: Nov. 25, 2008

(54) METHOD FOR MANUFACTURING METAL SULFIDE NANOCRYSTALS USING THIOL COMPOUND AS SULFUR PRECURSOR

(75) Inventors: Shin Ae Jun, Gyeonggi-Do (KR); Eun Joo Jang, Gyeonggi-Do (KR); Seong Jae Choi, Seoul (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 171 days.

(21) Appl. No.: 10/967,238

(22) Filed: Oct. 19, 2004

(65) Prior Publication Data
US 2006/0039850 A1 Feb. 23, 2006

(30) Foreign Application Priority Data
Apr. 20, 2004 (KR) ................. 10-2004-0027014

(51) Int. Cl.
*B05D 7/00* (2006.01)
*C01B 17/00* (2006.01)
*C01B 17/20* (2006.01)

(52) U.S. Cl. .................. 423/561.1; 423/22; 423/23; 423/49; 423/53; 423/62; 423/69; 423/89; 423/99; 423/111; 423/138; 423/566.1; 252/301.6 S; 977/773; 977/774; 977/775; 977/834; 427/212; 427/215

(58) Field of Classification Search .......... 252/301.6 S; 423/561.1, 566.1, 99, 89, 111, 69, 62, 53, 423/49, 138, 23, 22; 977/773, 774, 775, 977/834; 428/690, 917; 313/504, 506; 257/102, 257/103; 427/212, 215
See application file for complete search history.

(56) References Cited

U.S. PATENT DOCUMENTS

| | | | |
|---|---|---|---|
| 5,770,172 A * | 6/1998 | Linehan et al. .......... 423/561.1 |
| 6,207,229 B1 | 3/2001 | Bawendi et al. |
| 6,225,198 B1 | 5/2001 | Alivisatos et al. |
| 6,322,901 B1 | 11/2001 | Bawendi et al. |
| 6,379,635 B2 * | 4/2002 | O'Brien et al. ............... 423/87 |
| 6,576,291 B2 | 6/2003 | Bawendi et al. |
| 2004/0023010 A1 * | 2/2004 | Bulovic et al. .............. 428/209 |
| 2006/0062720 A1 * | 3/2006 | Jang et al. ................ 423/566.1 |

OTHER PUBLICATIONS

Narayan Pradhan et al. "Single-Precursor, One-Pot Versatile Synthesis under near Ambient Conditions of Tunable, Single and Dual Band Fluorscing Metal Sulfide Nanoparticles" J. Am. Chem. Soc. (2003) 125, pp. 2050-2051, published on web at Jan. 30, 2003.*
C. B. Murray et al. "Synthesis and Characterization of Nearly Monodisperse CdE (E=S, Se, Te) Semiconductor Nanocrystallites" J. Am. Chem. Soc., vol. 115 (1993), pp. 8706-8715.*
J. E. Bowen Katari et al. "X-Ray Photoelectron Spectroscopy of CdSe Nanocrystals with Application to Studies of the Nanocrystal Surface" J. Phys. Chem., vol. 98 (1994), pp. 4109-4117.*

* cited by examiner

*Primary Examiner*—Timothy C Vanoy
(74) *Attorney, Agent, or Firm*—Buchanan Ingersoll & Rooney PC (57) ABSTRACT

Disclosed herein is a method for manufacturing metal sulfide nanocrystals using a thiol compound as a sulfur precursor. The method comprises reacting the thiol compound and a metal precursor in a solvent to grow metal sulfide crystals to the nanometer-scale level. Further disclosed is a method for manufacturing metal sulfide nanocrystals with a core-shell structure by reacting a metal precursor and a thiol compound in a solvent to grow a metal sulfide layer on the surface of a core. The metal sulfide nanocrystals prepared by these methods can have a uniform particle size at the nanometer-scale level, selective and desired crystal structures, and various shapes.

28 Claims, 4 Drawing Sheets

METHOD FOR MANUFACTURING METAL SULFIDE NANOCRYSTALS USING THIOL COMPOUND AS SULFUR PRECURSOR

BACKGROUND OF THE INVENTION

This non-provisional application claims priority under 35 U.S.C. 119(a) on Korean Patent Application No. 2004-27014 filed on Apr. 20, 2004, which is herein expressly incorporated by reference in its entirety.

1. Field of the Invention

The present invention relates to a method for manufacturing metal sulfide nanocrystals using a thiol compound as a sulfur precursor, and more particularly to a method for manufacturing metal sulfide nanocrystals using a thiol compound as a sulfur precursor wherein the metal sulfide nanocrystals can have a uniform particle size at the nanometer-scale level, selective and desired crystal structures, and various shapes.

2. Description of the Related Art

Nanocrystals exhibit electrical, magnetic, optical, chemical and mechanical properties distinct from bulky materials. Since these properties are controllable depending on the size of nanocrystals, there has been a great deal of interest in nanocrystals. In particular, when compound semiconductor materials, including metal sulfides (e.g., CdS, ZnS and PbS) are formed into nanometer-sized crystals, their bandgap energies are changed due to quantum confinement effects.

Accordingly, when the structure, shape and size of nanocrystals are controlled, energy levels over a very broad range of wavelengths can be obtained while the properties of the bulky materials are varied. These compound semiconductor materials can be prepared by common vapor deposition techniques. In recent years, there have been a number of studies to prepare semiconductor nanocrystals by a wet chemistry technique wherein a precursor material is added to a coordinating organic solvent and nanocrystals are grown so as to have an intended size. According to the wet chemistry technique, as the nanocrystals are grown, the organic solvent is naturally coordinated to the surface of the nanocrystals, acting as a dispersant. Accordingly, the organic solvent allows the nanocrystals to grow to the nanometer-scale level. The wet chemistry technique has an advantage in that nanocrystals of a variety of sizes can be uniformly prepared by appropriately controlling the concentration of precursors used, the kind of organic solvents, and preparation temperature and time, etc. Since Group II-VI compound semiconductor nanocrystals can emit light in the visible region, and are easy to synthesize as compared to Group III-V compound semiconductor nanocrystals, they are actively under study.

U.S. Pat. No. 6,225,198 discloses a process for forming shaped Group II-VI compound semiconductor nanocrystals having uniform size by wet synthesis. According to this patent, the Group II-VI compound semiconductor nanocrystals are prepared by mixing a solution of a Group II element and a solution of a Group VI element in the presence of suitable dispersant and solvent under appropriate temperature conditions. Specifically, the Group II-VI compound semiconductor nanocrystals are prepared by mixing a solution of an organometallic compound containing a Group II element (e.g., dimethyl cadmium), and a solution of a Group VI element (S, Se or Te) in an organic solvent (e.g., trioctyl phosphine).

U.S. Pat. No. 6,576,291 reports a method for manufacturing Group II-VI compound semiconductor nanocrystals by mixing a solution of a Group II metal salt, such as cadmium acetate or cadmium oxide, with a solution of a compound of a Group VI element bonded with phosphine chalcogenide, bis(silyl) chalcogenide, dioxygen, ammonium salt or tris(silyl) pnictide.

U.S. Pat. No. 6,322,901 describes core-shell structured Group II-VI and Group III-V compound semiconductor nanocrystals with improved luminescence efficiency. The core-shell structured compound semiconductor nanocrystals are prepared by forming a compound semiconductor layer on the surface of core nanocrystals. The compound semiconductor layer has a larger energy bandgap than the core nanocrystals. In addition, a method for preparing the core-shell structured compound semiconductor nanocrystals is disclosed in U.S. Pat. No. 6,207,229. According to these patent publications, the core is composed of compound semiconductors having uniform size distribution, and the compound semiconductor layer is uniformly formed on the core surface. The compound semiconductor nanocrystals thus prepared have a full width half maximum (FWHM) of 60 nm or less.

The method for manufacturing the compound semiconductor nanocrystals comprises placing the compound semiconductor core nanocrystals having uniform size distribution in a reaction solvent, and crystal-growing a compound semiconductor precursor on the surface of the core nanocrystals at an optimum reaction temperature to form a core-shell structure (passivation process). At this time, an organometallic compound (e.g., dimethyl cadmium or diethyl zinc) is used as a metal precursor, and bis(silyl) chalcogenide-based Group VI element compound (e.g., hexamethyldisilanthiane) is used as a precursor of the Group VI element. Alternatively, Group II-VI compound semiconductor nanocrystals can be prepared by using a precursor containing both a Group II metal and a Group VI element, such as cadmium dithiocarbamate, cadmium diselenocarbamate, zinc dithiocarbamate, bis-(hexylmethyldithio) cadmium, or bis-(hexylmethyldithio) zinc, by pyrolysis (Chemistry of Material, 2001, 13, 913).

In the case where organic solvents, such as trioctyl phosphine, trioctyl phosphine oxide, trioctyl amine, hexadecyl amine and octadecene, are used to prepare Group II-VI compound semiconductor nanocrystals and core-shell structured nanocrystals by wet synthesis, precursors usable for synthesis fall within the range defined in the patent publications and journal articles mentioned above. In particular, numerous studies have focused on cadmium telluride and cadmium selenide.

On the other hand, there have been various attempts to control reaction rate by varying reaction solvents and coordination degree of precursors used to prepare metal sulfides, such as CdS, ZnS and PbS. For example, CdS nanocrystals can be prepared by using a solvent, such as octadecene, which does not coordinate to precursors and nanocrystals to be prepared, to increase the reaction rate (Angew. Chem. Int. Ed. 2002, 41, 2368). Further, ZnS, CdS and PbS nanocrystals can be prepared by using a linear amine having a small-volume alkyl group, e.g., oleylamine, as a solvent for increasing the reaction rate between precursors (J. Am. Chem. Soc., 2003, 125, 11100). Further, a great deal of research has been conducted on the preparation of metal sulfide nanocrystals by reacting a metal salt with sodium sulfide ($Na_2S$), ammonium sulfide (($NH_3$)$_2$S), or hydrogen sulfide gas in a strongly basic solution or an aqueous solution containing a surfactant, without the use of an organic solvent. Disadvantageously, the metal sulfide nanocrystals thus prepared have non-uniform size distribution and shape. For example, when the nanocrystals have an average particle size of 4 nm, they have a broad size distribution ranging from 2~6 nm (J. Am. Chem. Soc., 1987, 109, 5649; and The Journal of Chemical Physics, 1984, 80, 4464). It has been recently found that CdS nanocrystals can be prepared by using a metal xanthate (R—CH$_2$—CH$_2$—O—CS$_2^-$M$^+$) as a novel sulfur precursor under relatively mild reaction conditions (J. Am. Chem. Soc., 2003, 125, 2050).

SUMMARY OF THE INVENTION

The present inventors have found that when metal sulfide particles are prepared by using a thiol compound as a sulfur precursor under controlled reaction conditions, the resulting nanocrystals can have a uniform particle size at the nanometer-scale level, selective and desired crystal structures and various shapes, and as a result, accomplished the present invention.

In accordance with one aspect of the present invention, a method is provided herein for manufacturing metal sulfide nanocrystals by reacting a metal precursor and a thiol compound in a solvent.

In accordance with another aspect of the present invention, a method is provided herein for manufacturing metal sulfide nanocrystals with a core-shell structure by reacting a metal precursor and a thiol compound in a solvent to form a metal sulfide layer on the surface of a core.

In accordance with another aspect of the present invention, metal sulfide nanocrystals prepared by one of the methods are provided herein.

In accordance with yet another aspect of the present invention, an inorganic-organic hybrid electroluminescence device comprising the metal sulfide nanocrystals prepared by one of the methods is provided herein.

The present invention will now be described in more detail.

The method of the present invention utilizes a thiol compound as a novel sulfur precursor for the preparation of metal sulfide nanocrystals. First, a solution of a thiol compound is mixed with a solution containing at least one metal precursor. In the reaction solution, the thiol compound is reacted with the metal precursor to prepare metal sulfide nanocrystals.

According to the method of the present invention, the use of the thiol compound as a sulfur precursor to grow the metal sulfide nanocrystals in a solution state enables the metal sulfide nanocrystals to have a uniform size distribution (5% or less) at the nanometer-scale level, selective and desired crystal structures, and various shapes. In addition, since a portion of the thiol compound remains coordinated to the surface of the grown nanocrystals, the surface characteristics of the nanocrystals can be controlled depending on the kind of functional groups included in the thiol compound, without additional surface displacement. Alternatively, in the case where a metal sulfide crystal layer is grown on the surface of another kind of nanocrystals, defects present on the surface can be protected, and thus the optical and electrical properties can be controlled.

The reactivity of the thiol compound with the metal precursor can be controlled depending on the kind of thiol compounds used in the method for manufacturing nanocrystals according to the present invention, enabling control over the crystal growth rate and crystal structure of the metal sulfide nanocrystals. Sulfur precursors used hitherto include organic solvent-coordinated sulfur compounds, such as trioctyl phosphine-coordinated sulfur compounds, and bis(silyl) chalcogenide-based precursors, such as hexamethyldisilanthiane. The presence of such electron-donating ligands makes the central sulfur atom highly neutrophilic. Since the bis(silyl) chalcogenide-based precursors contain easily cleavable S—Si bonds, they are highly reactive sulfur compounds capable of easily forming metal sulfide bonds after reaction with a metal. The sulfur atoms included in a metal xanthate (R—CH$_2$—CH$_2$—O—CS$_2^-$M$^+$) as another sulfur precursor are highly neutrophilic, and the S—S bond is easily cleavable. Since the thiol compound used in the present invention contains a highly stable S—C bond, compared to the highly reactive sulfur precursors discussed above, the reaction can proceed under more controlled conditions. For example, in the case where hexamethyldisilanthiane is used as a neutrophilic sulfur precursor, the reaction time can be controlled within the range of about 20 seconds to 10 minutes while the reaction temperature is maintained at 300° C. In the case of metal xanthates, metal sulfide nanocrystals can be prepared at a temperature lower than 100° C. within 30 minutes or less. In contrast, when the thiol compound is used as a sulfur precursor, the reaction time can be controlled within the range of 20 seconds to 60 minutes while the reaction temperature is maintained at 300° C. Accordingly, the method of the present invention has the advantage that the reaction conditions can be controlled over a sufficient period of time.

Further, nanocrystals having different crystal structures can be prepared by varying the kind of thiol compounds used. As described in Examples 1 & 2, CdS nanocrystals with a Wurzite structure are prepared by using octadecane thiol having a relatively long alkyl chain, but CdS nanocrystals with a zincblende structure are prepared by using octane thiol having a relatively short alkyl chain, even under the same temperature and solvent conditions. If thiol compounds leading to different crystal structures are mixed with each other, novel types of crystals having combined crystal structures can be prepared depending on the preparation conditions. Also, it is possible to control the preparation conditions so as to allow the crystals to have different crystal structures. Since the thiol compound has different degrees of adsorption relative to crystal planes, crystals can be controlled to continuously grow on a specific crystal plane depending only on the preparation conditions. Accordingly, the method of the present invention is expected to freely control the shape of crystals.

It is assumed that the thiol compound functions as a sulfur precursor during preparation of the metal sulfide crystals, and at the same time, unreacted thiol compound acts as a kind of dispersant surrounding the surface of the metal sulfide crystals. Accordingly, the use of at least one thiol compound having various kinds of functional groups enables the preparation of metal sulfide nanocrystals whose surface characteristics, such as polarity and binding properties, are controlled, without additional surface displacement.

Further, depending on the kind of included functional groups, the thiol compound is highly miscible with various solvents. Since common sulfur precursors used for the preparation of the nanocrystals are dissolved only in particular coordinating solvents, such as trioctyl phosphine, there are limitations in obtainable concentrations of the solutions and preparation conditions. In contrast the thiol compound used in the present invention can be used in any solvent, including mixed solvents of polar and non-polar solvents immiscible with the thiol compound. Further, since the thiol compound exhibits no toxicity, it can be safely used.

The method of the present invention is characterized by the use of the thiol compound for the preparation of metal sulfide nanocrystals having various crystal shapes, desired structures, and controlled surface characteristics.

In one embodiment of the present invention, metal sulfide nanocrystals are prepared by reacting a metal precursor and a thiol compound in a solvent.

Specifically, an embodiment of the present invention is a method for manufacturing the metal sulfide nanocrystals comprising the steps of: (1) adjusting the temperature of a reaction solution containing a metal precursor and a dispersant to a particular temperature; (2) preparing a reaction solution of a thiol compound; (3) feeding the reaction solution of step (2) to the reaction solution of step (1), and reacting the mixed solution for a given time to prepare metal sulfide nanocrystals; and (4) separating the metal sulfide nanocrystals after completion of the reaction. However, the present invention is not limited to this method. That is, the method of the present invention can be variously modified and altered by already known processes in the art.

In another embodiment of the present invention, metal sulfide nanocrystals having a core-shell structure are prepared by reacting a metal precursor and a thiol compound in a solvent to form a metal sulfide layer on the surface of a core.

Specifically, another embodiment of the present invention is a method for manufacturing the metal sulfide nanocrystals having a core-shell structure comprising the steps of: (1) adjusting the temperature of a reaction solution containing a core to a particular temperature; (2) preparing a reaction solution containing a metal precursor and a dispersant; (3) preparing a reaction solution of a thiol compound; (4) sequentially or simultaneously feeding the reaction solutions of steps (2) and (3) to the reaction solution of step (1), and reacting the mixed solution for a given time to prepare metal sulfide nanocrystals having a core-shell structure; and (5) separating the metal sulfide nanocrystals after completion of the reaction. However, the present invention is not limited to this method. That is, the method of the present invention can be variously modified and altered by already known processes in the art. For instance, a solution of a metal precursor and a solution of a thiol compound may be sequentially or simultaneously added to a solution containing core nanocrystals to form a metal sulfide layer on the core nanocrystals, or a solution of a thiol compound may be added to a solution containing a metal precursor and core nanocrystals.

Since the thiol compound is highly reactive with the surface of the core nanocrystals, the addition of the thiol compound to the solution of the core nanocrystals permits the thiol compound to selectively surround the surface of the core nanocrystals. If a metal precursor is included in the solution, the metal precursor starts to react with the thiol compound to grow metal sulfide nanocrystals on the core surface. The grown metal sulfide layer removes defects present on the surface of the nanocrystals, and changes the surface characteristics. The formation of the metal sulfide layer, such as CdTe/CdS or CdSe/CdS layer, having a larger energy bandgap than the core nanocrystals on the core surface causes quantum confinement effects due to the difference in energy bandgap, and improves the luminescence efficiency. The core nanocrystals used herein are not limited to compound semiconductor materials alone, and include a variety of metal oxides and nanocrystals, such as metal nanocrystals.

Specific examples of core nanocrystals usable in the present invention include compound semiconductor nanocrystals, such as CdS, CdSe, CdTe, ZnS, ZnSe, ZnTe, HgS, HgSe, HgTe, GaN, GaP, GaAs, InP, and InAs nanocrystals; metal oxide nanocrystals, such as $TiO_2$, $SiO_2$, CdO, $Fe_2O_3$, CuO, AgO, and ZrO nanocrystals; and metal nanocrystals, such as Pt, Pd, Ru, Rh, Ir, Au, Ag, Fe, Co, Ni, Si, and Ge nanocrystals. The core may have various shapes, e.g., spheres, rods, tripods, tetrapods, cubes, boxes, stars, and mixed forms thereof.

The metal sulfide nanocrystal or the metal sulfide layer formed on the core is composed of CdS, ZnS, HgS, PbS, SnS, $SnS_2$, GeS, GaS, InS, $In_2S_3$, TlS, $Tl_2S$, $TiS_2$, MnS, $MnS_2$, FeS, $Fe_2S_3$, $FeS_2$, NiS, CuS, $MoS_2$, PdS, $Ag_2S$, AgS, $PtS_2$, AuS, $Au_2S_3$, or $Au_2S$. If two or more metal sulfides are present as nanocrystals, they may be partially localized or may be present in an alloy form.

The thiol compound used in the present invention is a compound in which a thiol group is bonded to one terminal position of an alkyl chain or aomatic ring. The alkyl chain may be unsubstituted or substituted with at least one functional group selected from the group consisting of carboxyl, amide, phenyl, amine, acryl, silane, phosphine, phosphinic acid, cyano, and thiol groups, at the side chain or the other terminal position. Also, the aromatic ring may be unsubstituted or substituted with at least one functional group selected from the group consisting of alkyl, carboxyl, amide, phenyl, amine, acryl, silane, phosphine, phosphinic acid, cyano, and thiol groups, at the other terminal position. These compounds may be used alone, or in combination as a mixture. When the thiol compound is composed of an alkyl chain, the alkyl chain preferably has 2 to 18carbon atoms. Meanwhile, when the thiol compound is composed of an aromatic ring, the aromatic ring preferably has 6 to 120 carbon atoms.

Metal precursors usable in the present invention include, for example, organometallic compounds including Zn, Cd, Hg, Pb, Sn, Ge, Ga, In, Tl, Sc, Ti, V, Cr, Mn, Fe, Co, Ni, Cu, Y, Zr, Nb, Mo, Tc, Pd, Ag, Pt or Au, and salts thereof.

Specific examples of metal precursors usable in the present invention include, but are not limited to, dimethyl zinc, diethyl zinc, zinc acetate, zinc acetylacetonate, zinc iodide, zinc bromide, zinc chloride, zinc fluoride, zinc carbonate, zinc cyanide, zinc nitrate, zinc oxide, zinc peroxide, zinc perchlorate, zinc sulfate, dimethyl cadmium, diethyl cadmium, cadmium acetate, cadmium acetylacetonate, cadmium iodide, cadmium bromide, cadmium chloride, cadmium fluoride, cadmium carbonate, cadmium nitrate, cadmium oxide, cadmium perchlorate, cadmium phosphide, cadmium sulfate, mercury acetate, mercury iodide, mercury bromide, mercury chloride, mercury fluoride, mercury cyanide, mercury nitrate, mercury oxide, mercury perchlorate, mercury sulfate, lead acetate, lead bromide, lead chloride, lead fluoride, lead oxide, lead perchlorate, lead nitrate, lead sulfate, lead carbonate, tin acetate, tin bisacetylacetonate, tin bromide, tin chloride, tin fluoride, tin oxide, tin sulfate, germanium tetrachloride, germanium oxide, germanium ethoxide, gallium acetylacetonate, gallium chloride, gallium fluoride, gallium oxide, gallium nitrate, gallium sulfate, indium chloride, indium oxide, indium nitrate, indium sulfate, thallium acetate, thallium acetylacetonate, thallium chloride, thallium oxide, thallium ethoxide, thallium nitrate, thallium sulfate, thallium carbonate, scandium acetate, scandium chloride, scandium oxide, scandium nitrate, scandium sulfate, titanium chloride, titanium fluoride, titanium oxide, titanium isopropoxide, vanadium acetylacetonate, vanadium chloride, vanadium fluoride, vanadium oxide, chromium acetate, chromium acetylacetonate, chromium chloride, chromium fluoride, chromium oxide, chromium nitrate, chromium sulfate, manganese acetate, manganese acetylacetonate, manganese carbonate, manganese bromide, manganese chloride, manganese fluoride, manganese oxide, manganese sulfate, manganese perchlorate, iron acetate, iron acetylacetonate, iron bromide, iron chloride, iron fluoride, iron oxide, iron nitrate, iron sulfate, iron oxalate, iron perchlorate, cobalt acetate, cobalt acetylacetonate, cobalt bromide, cobalt chloride, cobalt fluoride, cobalt oxide, cobalt nitrate, cobalt sulfate, cobalt perchlorate, nickel acetate, nickel acetylacetonate, nickel bromide, nickel chloride, nickel oxide, nickel nitrate, nickel sulfate, nickel perchlorate, tetrakis(triphenylphosphite) nickel, copper acetate, copper acetylacetonate, copper bromide, copper chloride, copper fluoride, copper oxide, copper nitrate, copper sulfate, copper perchlorate, copper cyanide, yttrium acetate, yttrium chloride, yttrium fluoride, yttrium oxide, yttrium nitrate, yttrium sulfate, yttrium carbonate, yttrium isopropoxide, zirconium bromide, zirconium chloride, zirconium fluoride, zirconium oxide, zirconium butoxide, niobium chloride, niobium fluoride, niobium oxide, niobium ethoxide, molybdenum chloride, molybdenum oxide, palladium acetate, palladium acetylacetonate, palladium bromide, dichlorobis(triphenylphosphine) palladium, palladium chloride, palladium nitrate, palladium sulfate, palladium cyanide, silver bromide, silver chloride, silver fluoride, silver oxide, silver nitrate, silver sulfate, silver carbonate, silver cyanide, dichloro(ethylenediamine) platinum, dichlorobis(triphenylphosphine) platinum, platinum acetylacetonate, platinum bromide, platinum chloride, platinum oxide, platinum nitrate, platinum cyanide, chloro(triphenylphosphine) gold, dimethyl(acetylacetonate) gold, gold bromide, gold chloride, gold oxide, gold cyanide, and the like.

Reaction solvents that may be used include, for example, primary alkylamines, secondary alkylamines, tertiary alkylamines, heterocyclic compounds containing at least one nitrogen or sulfur atom, alkanes, alkenes, alkynes, trioctyl phosphine, and trioctyl phosphine oxide. In addition, polar primary alcohols, secondary alcohols, tertiary alcohols, ketones, esters, and others can be used as reaction solvents. Furthermore, aqueous solutions, and combinations of aqueous solutions and organic solvents can be used as reaction solvents.

Examples of dispersants usable in the present invention include carboxylic acids, e.g., oleic acid, stearic acid, and palmitic acid; organic phosphorus acids, e.g., hexyl phosphonic acid, n-octyl phosphonic acid, tetradecyl phosphonic acid, and octadecyl phosphonic acid; and amines, e.g., n-octyl amine, and hexadecyl amine. Since the thiol compound is a sulfur precursor and acts as a dispersant, the method of the present invention may avoid the use of a dispersant.

The thiol compound is preferably diluted to a range of about 0.001 M to about 1 M in a solvent. Examples of solvents usable herein include solvents having a low boiling point, such as dimethyl chloride, toluene, hexane, heptane, octane, pyridine and butanol, in addition to the reaction solvents.

The reaction temperature is preferably in the range of about 80° C. to about 400° C., and preferably about 200° C. to about 350° C. When the reaction temperature exceeds 400° C., the crystal growth rate is too high, and thus the reaction is difficult to control. On the other hand, when the reaction temperature is lower than 80° C., the reaction rate is unfavorably slow. The reaction time may vary depending on the kind of the metal and the thiol compound, and preferably ranges from about one second to one day.

The nanocrystals prepared by the method of the present invention may have various shapes, e.g., spheres, rods, tripods, tetrapods, cubes, boxes, stars, and mixed forms thereof.

The metal sulfide nanocrystals, and the core-shell structured nanocrystals in which a metal sulfide layer is grown on the surface of a core, prepared by the method of the present invention can be utilized in various applications, such as displays, sensors, energy devices, and are useful to form a luminescent layer of an inorganic-organic hybrid electroluminescence device. Vacuum deposition, sputtering, printing, coating, ink-jetting, electron beam processes, and the like, can be employed to form a luminescent layer using the compound semiconductor nanocrystals. The luminescent layer thus formed preferably has a thickness of 50~100 nm. In addition to the luminescent layer, layers corresponding to organic layers in an inorganic-organic hybrid electroluminescence device are an electron transport layer and a hole transport layer, both of which are provided between a pair of electrodes and are composed of organic compounds.

A common electroluminescence device has a structure selected from anode/luminescent layer/cathode, anode/buffer layer/luminescent layer/cathode, anode/hole transport layer/luminescent layer/cathode, anode/buffer layer/hole transport layer/luminescent layer/cathode, anode/buffer layer/hole transport layer/luminescent layer/electron transport layer/cathode, anode/buffer layer/hole transport layer/luminescent layer/hole blocking layer/cathode structures, etc., but is not limited to these structures.

As materials of the buffer layer, compounds commonly used in the art can be used. Preferred examples include, but are not limited to, copper phthalocyanine, polythiophene, polyaniline, polyacetylene, polypyrrole, polyphenylene vinylene, and derivatives thereof.

As materials of the hole transport layer, compounds commonly used in the art, preferably polytriphenylamine, can be used, but the present invention is not limited to this compound.

As materials of the electron transport layer, compounds commonly used in the art, preferably polyoxadiazole, can be used, but the present invention is not limited to this compound.

As materials of the hole blocking layer, compounds commonly used in the art can be used. Preferred examples include, but are not limited to, LiF, $BaF_2$, $MgF_2$, and the like.

The inorganic-organic hybrid electroluminescence device of the present invention does not require particular fabrication apparatuses and methods, and can be fabricated in accordance with conventional fabrication methods of organic electroluminescence devices using common materials.

BRIEF DESCRIPTION OF THE DRAWINGS

The patent or application file contains at least one drawing executed in color. Copies of this patent or patent application publication with color drawing(s) will be provided by the U.S. Patent and Trademark Office upon request and payment of the necessary fee.

The above and other objects, features and other advantages of the present invention will be more clearly understood from the following detailed description taken in conjunction with the accompanying drawings, in which.

DESCRIPTION OF THE PREFERRED EMBODIMENTS

Hereinafter, the present invention will be described in more detail with reference to the following examples. However, these examples are given for the purpose of illustration and are not to be construed as limiting the scope of the invention.

EXAMPLE 1

Figure 1:
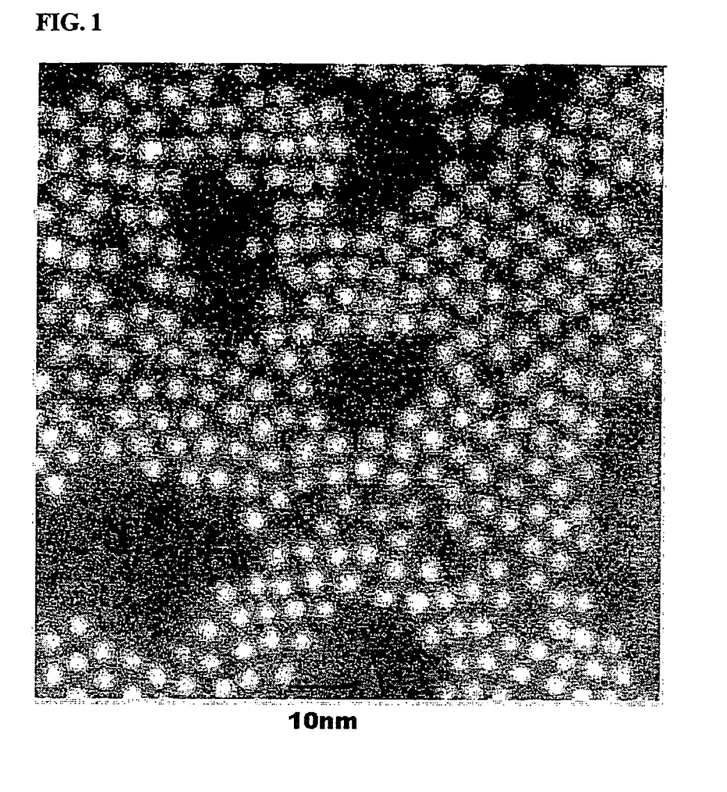
FIG. 1 is a scanning transmission electron micrograph (STEM) (scale bar=10 nm) of CdS nanocrystals prepared in Example 1 of the present invention.
Figure 2:
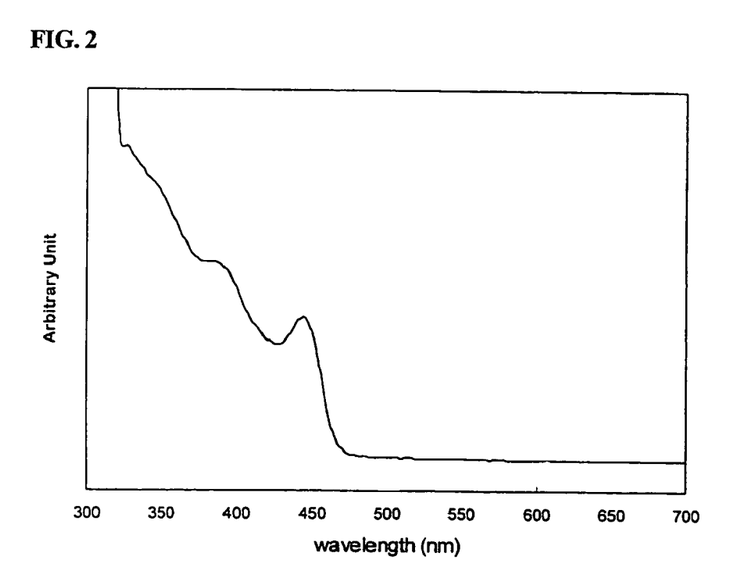
FIG. 2 is a UV absorption spectrum of CdS nanocrystals prepared in Example 1 of the present invention.

Preparation of CdS Nanocrystals using Octadecane Thiol 16 g of trioctyl amine (hereinafter, referred to as 'TOA'), 0.5 g of oleic acid, and 0.4 mmol of cadmium oxide were charged simultaneously into a 125 ml flask equipped with a reflux condenser. The reaction temperature of the mixture was adjusted to 300° C. with stirring. Separately, about 0.05 g of octadecane thiol was dissolved in 1 ml of TOA to form a solution. The resulting solution was rapidly fed to the previous mixture, and then reacted for 10 minutes with stirring. Immediately after the reaction was completed, the reaction mixture was rapidly cooled to room temperature. Ethanol as a non-solvent was added to the cooled reaction mixture, and the resulting mixture was then centrifuged. The precipitates were separated by decanting the solution, and dispersed in 5 ml toluene to obtain a solution of CdS nanocrystals. A scanning transmission electron micrograph of the CdS nanocrystals is shown in FIG. 1. As shown in FIG. 1, the CdS nanocrystals have a Wurzite structure, very uniform particle size, and uniform size distribution. FIG. 2 is a UV absorption spectrum of the CdS nanocrystals. As shown in FIG. 2, the presence of a sharp peak indicates that the CdS has superior crystallinity.

EXAMPLE 2

Figure 3:
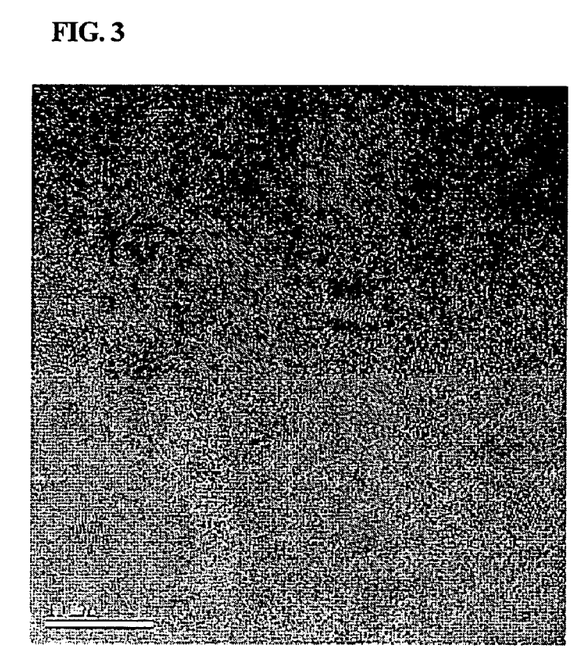
FIG. 3 is a transmission electron micrograph (scale bar=10 nm) of CdS nanocrystals prepared in Example 2 of the present invention.
Figure 4:
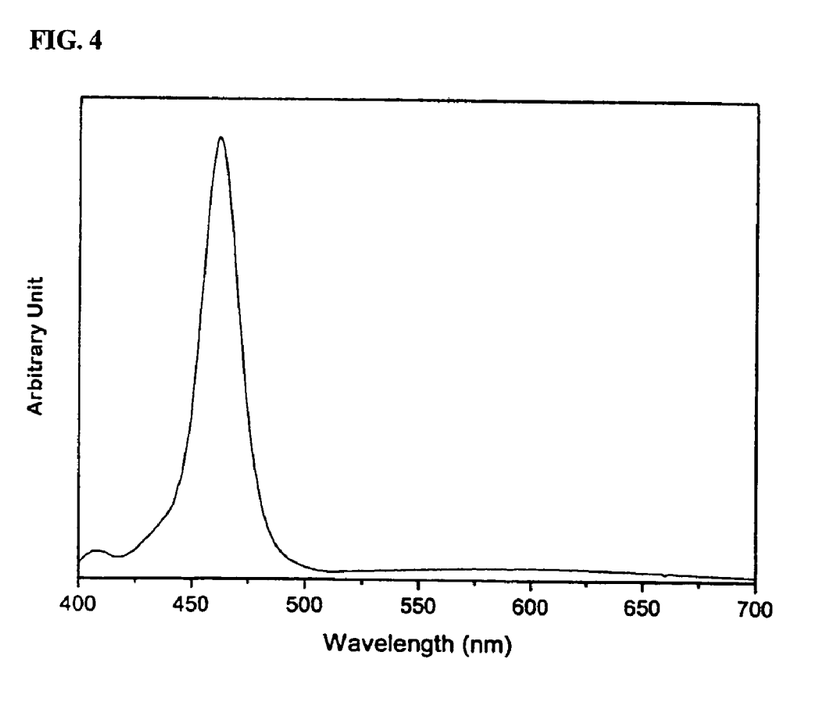
FIG. 4 is a photoluminescence spectrum of CdS nanocrystals prepared in Example 2 of the present invention.

Preparation of CdS Nanocrystals using Octane Thiol 16 g of TOA, 0.5 g of oleic acid, and 0.4 mmol of cadmium oxide were charged simultaneously into a 125 ml flask equipped with a reflux condenser. The reaction temperature of the mixture was adjusted to 300° C. with stirring. Separately, about 0.015 g of octane thiol was dissolved in 1 ml of TOA to form a solution. The resulting solution was rapidly fed to the previous mixture, and then reacted for 40 minutes with stirring. Immediately after the reaction was completed, the reaction mixture was rapidly cooled to room temperature. Ethanol as a non-solvent was added to the cooled reaction mixture, and the resulting mixture was then centrifuged. The precipitates were separated by decanting the solution, and dispersed in 5 ml toluene to obtain a solution of CdS nanocrystals. An electron micrograph of the CdS nanocrystals is shown in FIG. 3. As shown in FIG. 3, the CdS nanocrystals have a zincblende structure. FIG. 4 is a photoluminescence spectrum of the CdS nanocrystals. As shown in FIG. 4, one luminescence peak having a Full Width at Half Maximum (hereinafter, referred to as 'FWHM') of 20 nm was observed at around 460 nm.

EXAMPLE 3

Figure 5:
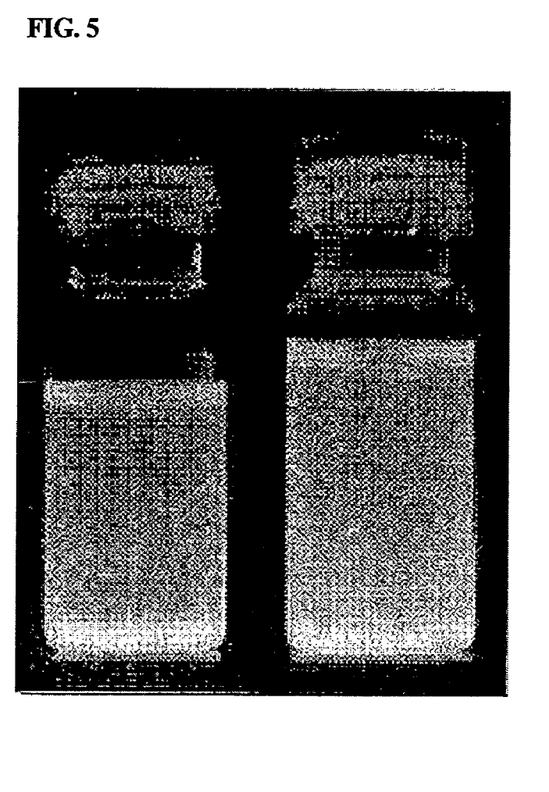
FIG. 5 is a photograph showing the luminescent state of CdTe nanocrystals and CdTe/CdS nanocrystals prepared in Example 3 of the present invention, taken under a UV lamp at 365 nm.
Figure 6:
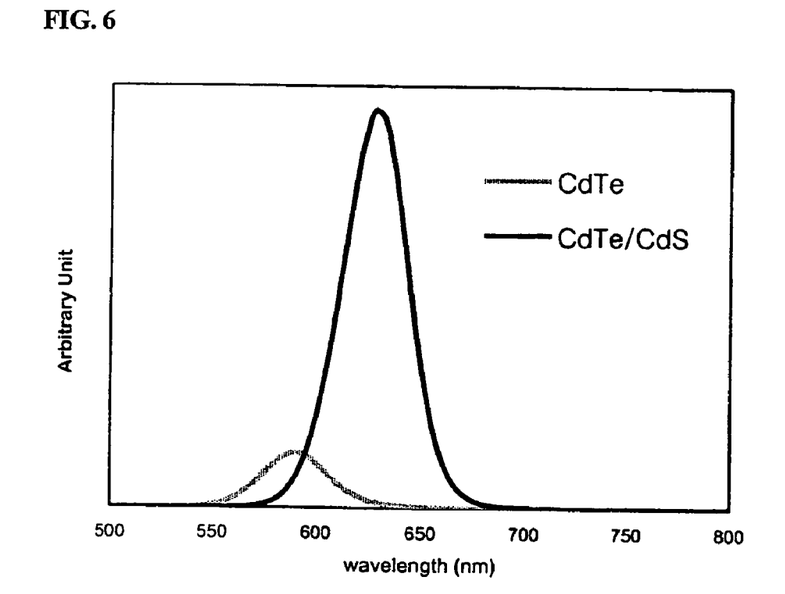
FIG. 6 shows photoluminescence spectra of CdTe nanocrystals, and CdTe/CdS nanocrystals prepared in Example 3 of the present invention.

Preparation of CdTe Nanocrystals and Formation of CdS Protective Layer 16 g of TOA, 0.3 g of octadecyl phosphonic acid, 0.4 mmol of cadmium oxide, and 0.017 g of Te powder were charged simultaneously into a 125 ml flask equipped with a reflux condenser. The reaction temperature of the mixture was adjusted to 330° C. with stirring. After 1 mL of trioctyl phosphine (hereinafter, referred to as "TOP") was rapidly added to the reaction mixture, the resulting reaction mixture was reacted for about 4 minutes. To a portion of the reaction mixture was slowly fed a solution of 0.04 g of octane thiol in 1 mL of TOA. The reaction mixture was allowed to stand at the same temperature for about 15 minutes. Immediately after the reaction was completed, the reaction mixture was rapidly cooled to room temperature. Ethanol as a non-solvent was added to the cooled reaction mixture, and the resulting mixture was then centrifuged. The precipitates were separated by decanting the solution, and dispersed in 5 ml toluene to obtain a solution of CdTe/CdS nanocrystals. FIG. 5 shows the state of the solutions of CdTe nanocrystals (solution on the left) and CdTe/CdS nanocrystals (solution on the right) under a UV lamp at 365 nm. It was confirmed from FIG. 5 that the luminescence efficiency was improved. FIG. 6 shows photoluminescence spectra of the CdTe nanocrystals before formation of the CdS layer, and CdTe/CdS nanocrystals after formation of the CdS layer. As shown in FIG. 6, two luminescence peaks having an FWHM of 40 nm were observed at 590 nm and 628 nm, respectively. In addition, the intensity of the peak after formation of the CdS layer was increased about 8 times higher than that of before the formation.

EXAMPLE 4

Figure 7:
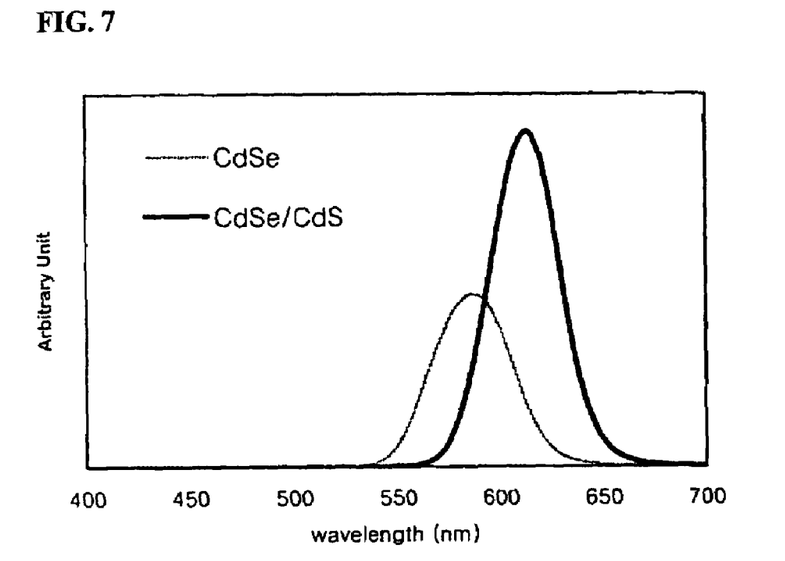
FIG. 7 shows photoluminescence spectra of CdSe nanocrystals, and CdSe/CdS nanocrystals prepared in Example 4 of the present invention.

Preparation of CdSe Nanocrystals and Formation of CdS Protective Layer 16 g of TOA, 2.0 g of oleic acid, and 1.6 mmol of cadmium oxide were charged simultaneously into a 125 ml flask equipped with a reflux condenser. The reaction temperature of the mixture was adjusted to 300° C. with stirring. Separately, a selenium (Se) powder was dissolved in TOP to obtain a Se-TOP complex solution in which the concentration of Se was about 0.2 M. 1 ml of the Se-TOP complex solution was rapidly fed to the previous mixture, and then reacted for 2 minutes with stirring. To a portion of the reaction mixture was slowly fed a solution of 0.06 g of octane thiol in 2 mL of TOA. The reaction mixture was allowed to stand at the same temperature for about 30 minutes. Immediately after the reaction was completed, the reaction mixture was rapidly cooled to room temperature. Ethanol as a non-solvent was added to the cooled reaction mixture, and the resulting mixture was then centrifuged. The precipitates were separated by decanting the solution, and dispersed in 5 ml toluene to obtain a solution of CdSe/CdS nanocrystals. FIG. 7 shows photoluminescence spectra of the CdSe nanocrystals before formation of the CdS layer, and CdSe/CdS nanocrystals after formation of the CdS layer. As shown in FIG. 7, two luminescence peaks having an FWHM of about 40 nm were observed at 586 nm and 614 nm, respectively. In addition, the intensity of the peak after formation of the CdS layer almost doubled.

EXAMPLE 5

Fabrication of Inorganic-Organic Electroluminescence Device using CdSe/CdS Nanocrystals In this example, an inorganic-organic electroluminescence device was fabricated by using the CdSe/CdS nanocrystals prepared in Example 4 as a luminescent layer. PEDOT (poly- 3,4-ethylenedioxythiophene) as a hole transport layer was spin-coated onto a patterned ITO substrate to a thickness of 50 nm, followed by baking. A solution of 1% by weight of the CdSe/CdS nanocrystals prepared in Example 4 in chlorobenzene was spin-coated on the hole transport layer, and dried to form a luminescent layer having a thickness of 5 nm. Alq$_3$ (tris(8-hydroxyquinoline) aluminum) was deposited onto the luminescent layer to form an electron transport layer having a thickness of about 40 nm. LiF and aluminum were sequentially deposited onto the electron transport layer to thicknesses of 1 nm and 200 nm, respectively, to fabricate an inorganic-organic hybrid electroluminescence device.

Figure 8:
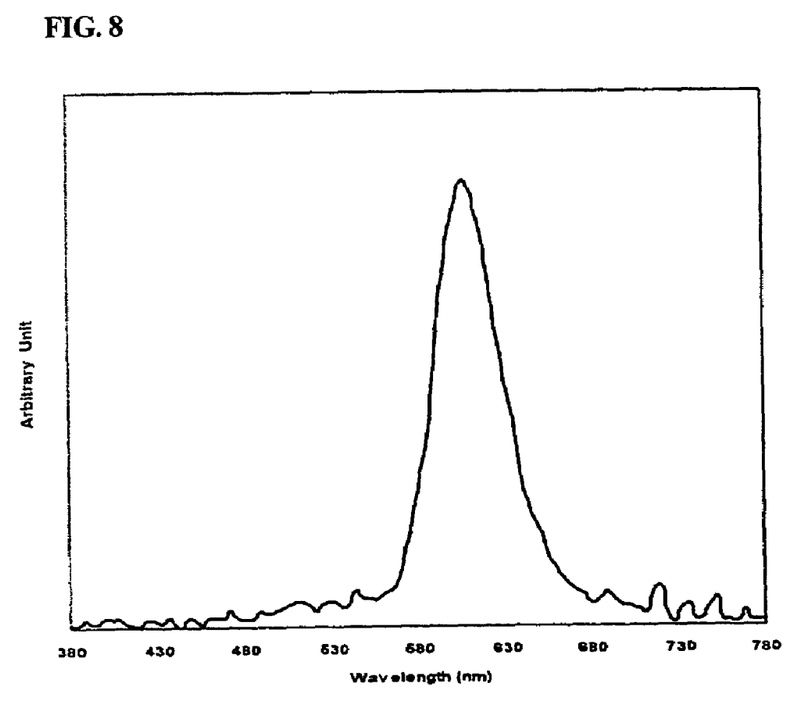
FIG. 8 is a luminescence spectrum of an electroluminescence device fabricated in Example 5 of the present invention.

The luminescence spectrum of the inorganic-organic hybrid electroluminescence device is shown in FIG. 8. One luminescence peak having an FWHM of approximately 46 nm was observed at around 608 nm. In addition, the luminous intensity of the device was 10 Cd/m$^2$, and the efficiency of the device was about 0.1%.

As apparent from the foregoing, the present invention provides a method for manufacturing metal sulfide nanocrystals using a thiol compound as a sulfur precursor under controlled conditions. The metal sulfide nanocrystals prepared by the method of the present invention have selective and desired crystal structures and various shapes. In addition, the surface characteristics of the metal sulfide nanocrystals can be controlled depending on the kind of functional groups included in the thiol compound. Alternatively, by forming a metal sulfide crystal layer on the surface of nanocrystals using a thiol compound, optical and electrical properties can be controlled, thus attaining desired properties, such as improved luminescence efficiency. Furthermore, since the thiol compound is highly miscible with various solvents, the metal sulfide nanocrystals can be prepared under various synthesis conditions.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for manufacturing metal sulfide nanocrystals by reacting a metal precursor and an alkyl thiol in a solvent, wherein the alkyl thiol reacts with the metal precursor to form the metal sulfide nanocrystals.

2. The method according to claim 1, wherein the method comprising the steps of:
   (1) adjusting the temperature of a reaction solution containing a metal precursor and a dispersant to a particular temperature;
   (2) preparing a reaction solution of an alkyl thiol;
   (3) feeding the reaction solution of step (2) to the reaction solution of step (1), and reacting the mixed solution for a given time to prepare metal sulfide nanocrystals; and
   (4) separating the metal sulfide nanocrystals after completion of the reaction.

3. The method according to claim 2, wherein the metal precursor is an organometallic compound comprising an element selected from the group consisting of Zn, Cd, Hg, Pb, Sn, Ge, Ga, In, Tl, Sc, Ti, V, Cr, Mn, Fe, Co, Ni, Cu, Y, Zr, Nb, Mo, Tc, Pd, Ag, Pt and Au, or a salt thereof.

4. The method according to claim 3, wherein the metal precursor is at least one organometallic compound selected from group consisting of dimethyl zinc, diethyl zinc, zinc acetate, zinc acetylacetonate, zinc iodide, zinc bromide, zinc chloride, zinc fluoride, zinc carbonate, zinc cyanide, zinc nitrate, zinc oxide, zinc peroxide, zinc perchlorate, zinc sulfate, dimethyl cadmium, diethyl cadmium, cadmium acetate, cadmium acetylacetonate, cadmium iodide, cadmium bromide, cadmium chloride, cadmium fluoride, cadmium carbonate, cadmium nitrate, cadmium oxide, cadmium perchlorate, cadmium phosphide, cadmium sulfate, mercury acetate, mercury iodide, mercury bromide, mercury chloride, mercury fluoride, mercury cyanide, mercury nitrate, mercury oxide, mercury perchlorate, mercury sulfate, lead acetate, lead bromide, lead chloride, lead fluoride, lead oxide, lead perchlorate, lead nitrate, lead sulfate, lead carbonate, tin acetate, tin bisacetylacetonate, tin bromide, tin chloride, tin fluoride, tin oxide, tin sulfate, germanium tetrachloride, germanium oxide, germanium ethoxide, gallium acetylacetonate, gallium chloride, gallium fluoride, gallium oxide, gallium nitrate, gallium sulfate, indium chloride, indium oxide, indium nitrate, indium sulfate, thallium acetate, thallium acetylacetonate, thallium chloride, thallium oxide, thallium ethoxide, thallium nitrate, thallium sulfate, thallium carbonate, scandium acetate, scandium chloride, scandium oxide, scandium nitrate, scandium sulfate, titanium chloride, titanium fluoride, titanium oxide, titanium isopropoxide, vanadium acetylacetonate, vanadium chloride, vanadium fluoride, vanadium oxide, chromium acetate, chromium acetylacetonate, chromium chloride, chromium fluoride, chromium oxide, chromium nitrate, chromium sulfate, manganese acetate, manganese acetylacetonate, manganese carbonate, manganese bromide, manganese chloride, manganese fluoride, manganese oxide, manganese sulfate, manganese perchlorate, iron acetate, iron acetylacetonate, iron bromide, iron chloride, iron fluoride, iron oxide, iron nitrate, iron sulfate, iron oxalate, iron perchlorate, cobalt acetate, cobalt acetylacetonate, cobalt bromide, cobalt chloride, cobalt fluoride, cobalt oxide, cobalt nitrate, cobalt sulfate, cobalt perchlorate, nickel acetate, nickel acetylacetonate, nickel bromide, nickel chloride, nickel oxide, nickel nitrate, nickel sulfate, nickel perchlorate, tetrakis(triphenylphosphite) nickel, copper acetate, copper acetylacetonate, copper bromide, copper chloride, copper fluoride, copper oxide, copper nitrate, copper sulfate, copper perchlorate, copper cyanide, yttrium acetate, yttrium chloride, yttrium fluoride, yttrium oxide, yttrium nitrate, yttrium sulfate, yttrium carbonate, yttrium isopropoxide, zirconium bromide, zirconium chloride, zirconium fluoride, zirconium oxide, zirconium butoxide, niobium chloride, niobium fluoride, niobium oxide, niobium ethoxide, molybdenum chloride, molybdenum oxide, palladium acetate, palladium acetylacetonate, palladium bromide, dichlorobis(triphenylphosphine) palladium, palladium chloride, palladium nitrate, palladium sulfate, palladium cyanide, silver bromide, silver chloride, silver fluoride, silver oxide, silver nitrate, silver sulfate, silver carbonate, silver cyanide, dichloro(ethylenediamine) platinum, dichlorobis(triphenylphosphine) platinum, platinum acetylacetonate, platinum bromide, platinum chloride, platinum oxide, platinum nitrate, platinum cyanide, chloro(triphenylphosphine) gold, dimethyl(acetylacetonate) gold, gold bromide, gold chloride, gold oxide, and gold cyanide.

5. The method according to claim 2, wherein the reaction solutions comprise a reaction solvent, wherein the reaction solvent is a primary alkylamine, a secondary alkylamine, a tertiary alkylamine, a heterocyclic compound containing at least one nitrogen or sulfur atom, an alkane, an alkene, an alkyne, trioctyl phosphine, trioctyl phosphine oxide, a primary alcohol, a secondary alcohol, a tertiary alcohol, a ketone, an ester, an aqueous solution, or a combination of an aqueous solution and an organic solvent.

6. The method according to claim 2, wherein the reaction temperature is in the range of about 80° C. to about 400° C.

7. The method according to claim 2, wherein the dispersant is a carboxylic acid selected from oleic acid, stearic acid, and palmitic acid; an organic phosphorous acid selected from hexyl phosphonic acid, n-octyl phosphonic acid, tetradecyl phosphonic acid, and octadecyl phosphonic acid; or an amine selected from n-octyl amine, and hexadecyl amine.

8. The method according to claim 1, wherein the alkyl thiol is a compound in which a thiol group is bonded to one terminal position of an alkyl chain, the alkyl chain being unsubstituted or substituted with at least one functional group selected from the group consisting of carboxyl, amide, phenyl, amine, acryl, silane, phosphine, phosphinic acid, cyano, and thiol groups, at the side chain or the other terminal position.

9. The method according to claim 8, wherein the alkyl chain has 2 to 18 carbon atoms.

10. The method according to claim 8, further comprising the step of: controlling the surface characteristics of the metal sulfide nanocrystals based on the functional group included in the alkyl thiol.

11. The method according to claim 8, further comprising the step of: controlling the crystal structure of the metal sulfide nanocrystals based on the functional group included in the alkyl thiol.

12. The method according to claim 1, wherein the metal sulfide nanocrystal is composed of at least one compound selected from the group consisting of CdS, ZnS, HgS, PbS, SnS, $SnS_2$, GeS, GaS, InS, $In_2S_3$, TIS, $Tl_2S$, $TiS_2$, MnS, $MnS_2$, FeS, $Fe_2S_3$, $FeS_2$, NiS, CuS, $MoS_2$, PdS, $Ag_2S$, AgS, $PtS_2$, AuS, $Au_2S_3$, and $Au_2S$.

13. The method according to claim 1, wherein the nanocrystals have a shape of a sphere, rod, tripod, tetrapod, cube, box, star, or a mixed form thereof.

14. A method for manufacturing metal sulfide nanocrystals with a core-shell structure by reacting a metal precursor and an alkyl thiol in a solvent to form a metal sulfide layer on the surface of a core.

15. The method according to claim 14, wherein the method comprising the steps of:
(1) adjusting the temperature of a reaction solution containing a core to a particular temperature;
(2) preparing a reaction solution containing a metal precursor and a dispersant;
(3) preparing a reaction solution of an alkyl thiol;
(4) sequentially or simultaneously feeding the reaction solutions of steps (2) and (3) to the reaction solution of step (1), and reacting the mixed solution for a given time to prepare metal sulfide nanocrystals having a core-shell structure; and
(5) separating the metal sulfide nanocrystals after completion of the reaction.

16. The method according to claim 15, wherein the metal precursor is an organometallic compound comprising an element selected from the group consisting of Zn, Cd, Hg, Pb, Sn, Ge, Ga, In, TI, Sc, Ti, V, Cr, Mn, Fe, Co, Ni, Cu, Y, Zr, Nb, Mo, Tc, Pd, Ag, Pt and Au, or a salt thereof.

17. The method according to claim 16, wherein the metal precursor is at least one organometallic compound selected from group consisting of dimethyl zinc, diethyl zinc, zinc acetate, zinc acetylacetonate, zinc iodide, zinc bromide, zinc chloride, zinc fluoride, zinc carbonate, zinc cyanide, zinc nitrate, zinc oxide, zinc peroxide, zinc perchlorate, zinc sulfate, dimethyl cadmium, diethyl cadmium, cadmium acetate, cadmium acetylacetonate, cadmium iodide, cadmium bromide, cadmium chloride, cadmium fluoride, cadmium carbonate, cadmium nitrate cadmium oxide, cadmium perchlorate, cadmium phosphide, cadmium sulfate, mercury acetate, mercury iodide, mercury bromide, mercury chloride, mercury fluoride, mercury cyanide, mercury nitrate, mercury oxide, mercury perchlorate, mercury sulfate, lead acetate, lead bromide, lead chloride, lead fluoride, lead oxide, lead perchlorate, lead nitrate, lead sulfate, lead carbonate, tin acetate, tin bisacetylacetonate, tin bromide, tin chloride, tin fluoride, tin oxide, tin sulfate, germanium tetrachloride, germanium oxide, germanium ethoxide, gallium acetylacetonate, gallium chloride, gallium fluoride, gallium oxide, gallium nitrate, gallium sulfate, indium chloride, indium oxide, indium nitrate, indium sulfate, thallium acetate, thallium acetylacetonate, thallium chloride, thallium oxide, thallium ethoxide, thallium nitrate, thallium sulfate, thallium carbonate, scandium acetate, scandium chloride, scandium oxide, scandium nitrate, scandium sulfate, titanium chloride, titanium fluoride, titanium oxide, titanium isopropoxide, vanadium acetylacetonate, vanadium chloride, vanadium fluoride, vanadium oxide, chromium acetate, chromium acetylacetonate, chromium chloride, chromium fluoride, chromium oxide, chromium nitrate, chromium sulfate, manganese acetate, manganese acetylacetonate, manganese carbonate, manganese bromide, manganese chloride, manganese fluoride, manganese oxide, manganese sulfate, manganese perchlorate, iron acetate, iron acetylacetonate, iron bromide, iron chloride, iron fluoride, iron oxide, iron nitrate, iron sulfate, iron oxalate, iron perchlorate, cobalt acetate, cobalt acetylacetonate, cobalt bromide, cobalt chloride, cobalt fluoride, cobalt oxide, cobalt nitrate, cobalt sulfate, cobalt perchlorate, nickel acetate, nickel acetylacetonate, nickel bromide, nickel chloride, nickel oxide, nickel nitrate, nickel sulfate, nickel perchlorate, tetrakis(triphenylphosphite) nickel, copper acetate, copper acetylacetonate, copper bromide, copper chloride, copper fluoride, copper oxide, copper nitrate, copper sulfate, copper perchlorate, copper cyanide, yttrium acetate, yttrium chloride, yttrium fluoride, yttrium oxide, yttrium nitrate, yttrium sulfate, yttrium carbonate, yttrium isopropoxide, zirconium bromide, zirconium chloride, zirconium fluoride, zirconium oxide, zirconium butoxide, niobium chloride, niobium fluoride, niobium oxide, niobium ethoxide, molybdenum chloride, molybdenum oxide, palladium acetate, palladium acetylacetonate, palladium bromide, dichlorobis(triphenylphosphine) palladium, palladium chloride, palladium nitrate, palladium sulfate, palladium cyanide, silver bromide, silver chloride, silver fluoride, silver oxide, silver nitrate, silver sulfate, silver carbonate, silver cyanide, dichloro(ethylenediamine) platinum, dichlorobis(triphenylphosphine) platinum, platinum acetylacetonate, platinum bromide, platinum chloride, platinum oxide, platinum nitrate, platinum cyanide, chloro(triphenylphosphine) gold, dimethyl(acetylacetonate) gold, gold bromide, gold chloride, gold oxide, and gold cyanide.

18. The method according to claim 15, wherein the reaction solutions comprise a reaction solvent, wherein the reaction solvent is a primary alkylamine, a secondary alkylamine, a tertiary alkylamine, a heterocyclic compound containing at least one nitrogen or sulfur atom, an alkane, an alkene, an alkyne, trioctyl phosphine, trioctyl phosphine oxide, a primary alcohol, a secondary alcohol, a tertiary alcohol, a ketone, an ester, an aqueous solution, or a combination of an aqueous solution and an organic solvent.

19. The method according to claim 15, wherein the reaction temperature is in the range of about 80° C. to about 400° C.

20. The method according to claim 15, wherein the dispersant is a carboxylic acid selected from oleic acid, stearic acid, and palmitic acid; an organic phosphorous acid selected from hexyl phosphonic acid, n-octyl phosphonic acid, tetradecyl phosphonic acid, and octadecyl phosphonic acid; or an amine selected from n-octyl amine, and hexadecyl amine.

21. The method according to claim 14, wherein the alkyl thiol is a compound in which a thiol group is bonded to one terminal position of an alkyl chain, the alkyl chain being unsubstituted or substituted with at least one functional group selected from the group consisting of carboxyl, amide, phenyl, amine, acryl, silane, phosphine, phosphinic acid, cyano, and thiol groups, at the side chain or the other terminal position.

22. The method according to claim 21, wherein the alkyl chain has 2 to 18 carbon atoms.

23. The method according to claim 21, further comprising the step of: controlling the surface characteristics of the metal sulfide nanocrystals based on the functional group included in the alkyl thiol.

24. The method according to claim 21, further comprising the step of: controlling the crystal structure of the metal sulfide nanocrystals based on the functional group included in the alkyl thiol.

25. The method according to claim 14, wherein the metal sulfide layer is composed of at least one compound selected from the group consisting of CdS, ZnS, HgS, PbS, SnS, $SnS_2$, GeS, GaS, InS, $In_2S_3$, TlS, $Tl_2S$, $TiS_2$, MnS, $MnS_2$, FeS, $Fe_2S_3$, $FeS_2$, NiS, CuS, $MoS_2$, PdS, $Ag_2S$, AgS, $PtS_2$, AuS, $Au_2S_3$, and $Au_2S$.

26. The method according to claim 14, wherein the core is a semiconductor nanocrystal selected from CdS, CdSe, CdTe, ZnS, ZnSe, ZnTe, HgS, HgSe, HgTe, GaN, GaP, GaAs, InP and InAs nanocrystals; a metal oxide nanocrystal selected from $TiO_2$, $SiO_2$, CdO, $Fe_2O_3$, CuO, AgO and ZrO nanocrystals; or a metal nanocrystal selected from Pt, Pd, Ru, Rh, Ir, Au, Ag, Fe, Co, Ni, Si and Ge nanocrystals.

27. The method according to claim 14, wherein the core has a shape of a sphere, rod, tripod, tetrapod, cube, box, star, or a mixed form thereof.

28. The method according to claim 14, further comprising the step of: controlling the optical and electrical properties of the metal sulfide nanocrystals.

* * * * *